(12) United States Patent
Hattori et al.

(10) Patent No.: US 9,718,106 B2
(45) Date of Patent: Aug. 1, 2017

(54) CENTRIFUGALLY CAST, HOT-ROLLING COMPOSITE ROLL

(71) Applicant: HITACHI METALS, LTD., Tokyo (JP)

(72) Inventors: Toshiyuki Hattori, Kitakyusyu (JP); Nozomu Oda, Kitakyusyu (JP); Yasunori Nozaki, Kitakyusyu (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/912,511

(22) PCT Filed: Sep. 17, 2014

(86) PCT No.: PCT/JP2014/074564
§ 371 (c)(1),
(2) Date: Feb. 17, 2016

(87) PCT Pub. No.: WO2015/045984
PCT Pub. Date: Apr. 2, 2015

(65) Prior Publication Data
US 2016/0193638 A1    Jul. 7, 2016

(30) Foreign Application Priority Data
Sep. 25, 2013  (JP) ................ 2013-198952

(51) Int. Cl.
*B21B 27/02*     (2006.01)
*B22D 13/02*     (2006.01)
(Continued)

(52) U.S. Cl.
CPC ............ *B21B 27/02* (2013.01); *B21B 27/032* (2013.01); *B22D 13/02* (2013.01); *C22C 37/00* (2013.01);
(Continued)

(58) Field of Classification Search
CPC ..... B21B 27/02; B21B 27/032; B21B 27/021; B21B 27/03; B22D 13/02; C22C 37/04;
(Continued)

(56) References Cited

U.S. PATENT DOCUMENTS 3,211,593 A * 10/1965 Krekeler .................. C21D 9/22
148/320
5,225,007 A * 7/1993 Hattori .................... B21B 27/00
148/324
(Continued)

FOREIGN PATENT DOCUMENTS

EP      0665068 A1    8/1995
EP      1832665 A1    9/2007
(Continued)

OTHER PUBLICATIONS

JP 8-20837A translation, Jan. 1996.*
(Continued)

*Primary Examiner* — Edward Tolan
(74) *Attorney, Agent, or Firm* — Sughrue Mion, PLLC (57) ABSTRACT

A centrifugally cast, hot-rolling composite roll comprising an outer layer formed by a centrifugal casting method, and an inner layer made of ductile cast iron and integrally fused to the outer layer; the outer layer having a chemical composition comprising by mass 1-3% of C, 0.4-3% of Si, 0.3-3% of Mn, 1-5% of Ni, 2-7% of Cr, 3-8% of Mo, 3-7% of V, and 0.01-0.12% of B, the balance being Fe and inevitable impurities, and meeting the relation expressed by $Cr/(Mo+0.5W) < -2/3[C-0.2(V+1.19Nb)]+11/6$, wherein $W=0$, and $Nb=0$, when W and Nb are not contained; and containing by area 1-15% of MC carbide, 0.5-20% of carboboride, and 0.5-20% of Mo-based carbide.

19 Claims, 5 Drawing Sheets

(51) Int. Cl.

| | | |
|---|---|---|
| *C22C 37/00* | (2006.01) | |
| *C22C 37/04* | (2006.01) | |
| *C22C 37/08* | (2006.01) | |
| *B21B 27/03* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/52* | (2006.01) | |
| *C22C 38/54* | (2006.01) | |
| *C22C 38/56* | (2006.01) | |
| *C22C 38/58* | (2006.01) | |

(52) U.S. Cl.
CPC .............. *C22C 37/04* (2013.01); *C22C 37/08* (2013.01); *C22C 38/00* (2013.01); *C22C 38/001* (2013.01); *C22C 38/02* (2013.01); *C22C 38/04* (2013.01); *C22C 38/06* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/56* (2013.01); *C22C 38/58* (2013.01); *C22C 2204/00* (2013.01)

(58) Field of Classification Search
CPC ......... C22C 37/06; C22C 38/12; C22C 38/22; C22C 38/36
See application file for complete search history.

(56) References Cited

U.S. PATENT DOCUMENTS

| | | | | | |
|---|---|---|---|---|---|
| 5,651,842 | A * | 7/1997 | Nakamura | .............. | C22C 38/22 148/321 |
| 6,024,916 | A * | 2/2000 | Urita | ...................... | C21D 6/002 148/334 |
| 6,171,222 | B1 * | 1/2001 | Lakeland | ................ | B21B 27/00 492/54 |
| 6,206,814 | B1 * | 3/2001 | Tanaka | .................... | B21B 27/00 148/541 |
| 6,579,833 | B1 * | 6/2003 | McNallan | ........... | A61F 2/30767 508/100 |
| 6,723,182 | B1 * | 4/2004 | Bahmiller | ............... | C22C 38/02 148/321 |
| 7,685,907 | B2 * | 3/2010 | Nolting, Jr. | ............. | B21C 25/00 76/107.1 |
| 2009/0092852 | A1 * | 4/2009 | Furushima | .............. | B21B 27/03 428/656 |

FOREIGN PATENT DOCUMENTS

| | | |
|---|---|---|
| JP | 61-26758 A | 2/1986 |
| JP | 8-20837 A | 1/1996 |
| JP | 10-8212 A | 1/1998 |
| JP | 11-302768 A | 11/1999 |
| JP | 2000-51912 A | 2/2000 |
| JP | 2002-161331 A | 6/2002 |
| JP | 2004-82209 A | 3/2004 |
| JP | 2005-264322 A | 9/2005 |
| JP | 2006-281301 A | 10/2006 |
| JP | 2007-245217 A | 9/2007 |

OTHER PUBLICATIONS

JP 2004-082209 translation, Mar. 2004.*
Japanese Office Action drafted Mar. 10, 2016, for corresponding Application No. 2015-533351.
Translation of Japanese Office Action drafted Oct. 13, 2015 for corresponding Application No. 2015-533351.
International Search Report of PCT/JP2014/074564, dated Nov. 18, 2014. [PCT/ISA/210].
Communication dated Apr. 6, 2017, issued from the European Patent Office in counterpart European Patent Application No. 14847369.7.

* cited by examiner

CENTRIFUGALLY CAST, HOT-ROLLING COMPOSITE ROLL

CROSS REFERENCE TO RELATED APPLICATIONS

This application is a National Stage of International Application No. PCT/JP2014/074564 filed Sep. 17, 2014 (claiming priority based on Japanese Patent Application No. 2013-198952, filed Sep. 25, 2013), the contents of which are incorporated herein by reference in their entirety.

FIELD OF THE INVENTION

The present invention relates to a centrifugally cast, hot-rolling composite roll having a composite structure comprising an outer layer having excellent wear resistance, seizure resistance (failure resistance) and surface roughening resistance, and an inner layer having excellent toughness.

BACKGROUND OF THE INVENTION

A heated slab as thick as several hundreds of millimeters, which is produced by continuous casting, etc., is rolled to thickness of several to several tens of millimeters by a hot strip mill comprising a roughing mill and a finishing mill. The finishing mill usually comprises 5 to 7 four-roll stands arranged in tandem. In the case of a seven-stand finishing mill, first to third stands are called "upstream stands," and fourth to seventh stands are called "downstream stands."

A working roll used in such a hot strip mill comprises an outer layer coming into contact with a hot thin strip, and an inner layer integrally fused to an inner surface of the outer layer. Because the outer layer in contact with a hot thin strip is subjected to a large thermal and mechanical rolling load by hot rolling in a certain period, its surface inevitably suffers damages such as wearing, roughening, heat cracking, etc. After removing these damages from the outer layer by machining, the working roll is used again for rolling. The removal of damages from an outer layer of the roll is called "damage-removing cutting." The working roll is discarded, after it is cut to remove damages from the initial diameter to the minimum diameter usable for rolling (discard diameter). A diameter in a range from the initial diameter to the discard diameter is called an effective rolling diameter. The outer layer in the effective rolling diameter range desirably has excellent wear resistance, failure resistance and surface roughening resistance to prevent a large surface damage such as heat cracking.

As working rolls used in downstream finishing stands in hot strip mills, which are required to have excellent wear resistance, failure resistance and surface roughening resistance, proposals have conventionally been made to provide composite rolls comprising outer layers made of highly alloyed grain cast iron having good failure resistance, to which hard carbide-forming elements such as Mo, V, etc. are add to improve wear resistance. For example, JP 2004-82209 A proposes a centrifugally cast, hot-rolling composite roll comprising an outer shell layer having a chemical component comprising by mass 3.0-4.0% of C, 0.8-2.5% of Si, 0.2-1.2% of Mn, 3.0-5.0% of Ni, 0.5-2.5% of Cr, 0.1-3.0% of Mo, and 1.0-5.0% of V, the balance being Fe and inevitable impurities; and a shaft portion made of usual cast iron or spherical graphite cast iron containing 2.5-4.0% of C, the thickness T of the outer shell layer and the radius R of the shaft portion meeting the relation of $0.03 \leq T/R \leq 0.5$. This composite roll has good seizure resistance and wear resistance. However, the outer layer of the hot-rolling composite roll has been getting required to have higher wear resistance.

Hot-rolling composite rolls having outer layers of high-speed steel having high wear resistance are also proposed. For example, as an outer layer of a composite roll used in upstream finishing stands of hot rolling, JP 08-020837 A discloses a high-speed steel outer layer of a rolling roll having a small friction coefficient, the outer layer comprising by weight 1.50-3.50% of C, 1.50% or less of Si, 1.20% or less of Mn, 5.50-12.00% of Cr, 2.00-8.00% of Mo, 3.00-10.00% of V, 0.60-7.00% of Nb, more than 0.01% and 0.200% or less of B, and more than 0.08% and 0.300% or less of N, the balance being Fe and inevitable impurities, and meeting the formula (1) of $V+1.8 \, Nb \leq 7.5 \, C-6.0$, and the formula (2) of $0.20 \leq Nb/V \leq 0.80$. Though the seizure resistance of the outer layer is improved by the addition of B, the outer layer is still insufficient in wear resistance, failure resistance and surface roughening resistance, which are required for the outer layers of hot-rolling composite rolls.

JP 2005-264322 A discloses a hot-rolling composite roll comprising an outer layer having excellent seizure resistance, and an inner layer integrally fused to the outer layer, the outer layer having a composition comprising by mass 1.8-3.5% of C, 0.2-2% of Si, 0.2-2% of Mn, 4-15% of Cr, 2-10% of Mo, 3-10% of V, 0.1-0.6% of P, and 0.05-0.5% of B, the balance being Fe and inevitable impurities, the outer layer optionally containing 3% or less of Nb, 5% or less of W, 5% or less of Ni, and 2% or less of Co. JP 2005-264322 A describes that 0.03% or less of S may be contained. However, this outer layer is still insufficient in wear resistance, failure resistance and surface roughening resistance.

JP 10-008212 A discloses a hot-rolling role having at least an outer shell layer made of high-carbon high-speed steel comprising by weight 1.5-3% of C, 0.5-5% of Cr, 0.5-8% of Mo, 1-8% of V, more than 1% to 8% of W, 0.1-5% of Nb, and 0.01-1% of B, and containing 5-20% by area of MC carbide having particle sizes of 15 μm or less and a major diameter/minor diameter ratio of 2 or less in the structure. It describes that S is regarded as an inevitable impurity, which may be contained in an amount of 0.08% or less. However, the outer shell layer of the roll of JP 10-008212 A does not have sufficient wear resistance, failure resistance and surface roughening resistance.

JP 61-26758 A discloses a composite roll outer layer having excellent seizure resistance, which has a chemical composition comprising by weight 1.0-2.0% of C, 0.2-2.0% of Si, 0.5-1.5% of Mn, 3.0% or less of Ni, 2-5% of Cr, 3-10% of Mo, 4.0% or less of V, and 0.1-0.6% of S, the balance being substantially Fe. However, because this composite roll outer layer does not contain B at all, it still does not have sufficient wear resistance, failure resistance and surface roughening resistance.

OBJECT OF THE INVENTION

Accordingly, an object of the present invention is to provide a centrifugally cast, hot-rolling composite roll comprising an outer layer having excellent wear resistance, failure resistance and surface roughening resistance, and a tough inner layer.

DISCLOSURE OF THE INVENTION

The centrifugally cast, hot-rolling composite roll of the present invention comprises an outer layer formed by a centrifugal casting method, and an inner layer made of ductile cast iron and integrally fused to the outer layer;

the outer layer having a chemical composition comprising by mass 1-3% of C, 0.4-3% of Si, 0.3-3% of Mn, 1-5% of Ni, 2-7% of Cr, 3-8% of Mo, 3-7% of V, and 0.01-0.12% of B, the balance being Fe and inevitable impurities, and meeting the relation expressed by the following formula (1):

$$Cr/(Mo+0.5W) < -2/3[C-0.2(V+1.19Nb)]+11/6 \quad (1),$$

wherein W=0, and Nb=0, when W and Nb, optional components, are not contained; and the outer layer containing by area 1-15% of MC carbide, 0.5-20% of carboboride, and 0.5-20% of Mo-based carbide.

The outer layer preferably further contains 3% or less by mass of Nb and 4% or less by mass of W.

The outer layer preferably further contains 0.05-0.3% by mass of S.

The outer layer preferably further contains 0.01-0.07% by mass of N.

The outer layer preferably further contains by mass at least one selected from the group consisting of 5% or less of Co, 0.5% or less of Zr, 0.5% or less of Ti, and 0.5% or less of Al.

The outer layer preferably meets the relation expressed by the following formula (2):

$$30.23+2.74\times(\text{area ratio of MC carbide})+4.01\times(\text{area ratio of Mo-based carbide})-5.63\times(\text{area ratio of carboboride}) \leq 50 \quad (2).$$

The outer layer preferably has Vickers hardness Hv of 500 or more.

DESCRIPTION OF THE PREFERRED EMBODIMENTS

The embodiments of the present invention will be explained in detail below without intention of restriction, and various modifications may be made within the scope of the present invention. Unless otherwise mentioned, the term "%" simply described means "% by mass."

[1] Centrifugally Cast, Hot-Rolling Composite Roll

Figure 1:
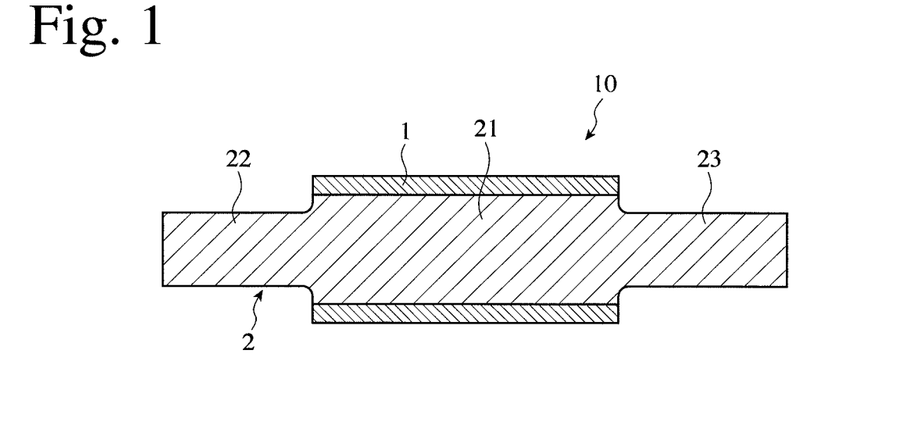
FIG. 1 is a schematic cross-sectional view showing a hot-rolling composite roll.

FIG. 1 shows a hot-rolling composite roll 10 comprising an outer layer 1 formed by a centrifugal casting method, and an inner layer 2 integrally fused to the outer layer 1. The inner layer 2 made of ductile cast iron is constituted by a core portion 21 fused to the outer layer 1, and shaft portions 22, 23 integrally extending from both ends of the core portion 21. The outer layer 1 is preferably made of high-speed steel.

(A) Outer Layer (1) Indispensable Elements (a) C: 1-3% by Mass

C is combined with V (Nb), Cr and Mo to form hard carbides, contributing to the improvement of wear resistance. When C is less than 1% by mass, the precipitation of MC carbide contributing to wear resistance is insufficient. On the other hand, when C exceeds 3% by mass, excessive amounts of carbides are precipitated, resulting in low toughness. The lower limit of the C content is preferably 1.4% by mass. The upper limit of the C content is preferably 2.9% by mass, more preferably 2.5% by mass, most preferably 2.3% by mass.

(b) Si: 0.4-3% by Mass

Si has an effect of deoxidizing the melt to reduce oxide defects. Less than 0.4% by mass of Si has an insufficient effect of deoxidizing the melt. Though Si is an element dissolved predominantly in the matrix, more than 3% by mass of Si makes the outer layer brittle. The lower limit of the Si content is preferably 0.45% by mass, more preferably 0.5% by mass. The upper limit of the Si content is preferably 2.7% by mass, more preferably 2.5% by mass, most preferably 2.0% by mass.

(c) Mn: 0.3-3% by Mass

Mn has a function to deoxidize the melt, and is combined with S to form MnS having a lubricating function. When Mn is less than 0.3% by mass, such effects are insufficient. On the other hand, even though Mn exceeds 3% by mass, further effects cannot be obtained. The lower limit of the Mn content is preferably 0.35% by mass. The upper limit of the Mn content is preferably 2.5% by mass, more preferably 1.9% by mass, most preferably 1.7% by mass.

(d) Ni: 1-5% by Mass

Ni has a function to improve the hardenability of the matrix. Accordingly, Ni added to a large composite roll can prevent pearlite from generating during cooling, thereby improving the hardness of the outer layer. However, more than 5% by mass of Ni makes austenite too stable, making it difficult to improve the hardness. The upper limit of the Ni content is preferably 4% by mass, more preferably 3.8% by mass, most preferably 3.5% by mass. The lower limit of the Ni content providing effects is 1% by mass, preferably 1.2% by mass.

(e) Cr: 2-7% by Mass

Cr is an effective element for providing a bainite or martensite matrix to have high hardness, thereby keeping wear resistance. When Cr is less than 2% by mass, such effects are insufficient. On the other hand, more than 7% by mass of Cr makes the matrix structure brittle. The lower limit of the Cr content is preferably 2.5% by mass, more preferably 3.0% by mass. The upper limit of the Cr content is preferably 6.8% by mass, more preferably 6.5% by mass.

(f) Mo: 3-8% by Mass

Mo is combined with C to form hard carbide ($M_6C$, $M_2C$), increasing the hardness of the outer layer. Mo also forms tough and hard MC carbide together with V (and Nb), improving wear resistance. When Mo is less than 3% by mass, such effects are insufficient. On the other hand, when Mo is more than 8% by mass, the outer layer has low toughness. The lower limit of the Mo content is preferably 3.5% by mass, more preferably 4.0% by mass. The upper limit of the Mo content is preferably 7.8% by mass, more preferably 7.6% by mass, most preferably 7.4% by mass.

(g) V: 3-7% by Mass

V is an element combined with C to form hard MC carbide. This MC carbide having Vickers hardness Hv of 2500-3000 is hardest among carbides. When V is less than 3% by mass, a sufficient amount of MC carbide is not precipitated. On the other hand, when V is more than 7% by mass, MC carbide having a low specific gravity is concentrated on the inner surface side by a centrifugal force during centrifugal casting, resulting in a large segregation of MC carbide in a radial direction, and making difficult the integral fusion of the outer layer to the inner layer. The lower limit of the V content is preferably 3.2% by mass, more preferably 3.5% by mass. The upper limit of the V content is preferably 6.9% by mass, more preferably 6.8% by mass, most preferably 6.7% by mass.

(h) B: 0.01-0.12% by Mass

B forms carboboride having a lubricating function. Carboboride is a phase comprising metal elements, carbon and boron. Typically, its main composition comprises 50-80% by mass of Fe, 5-17% by mass of Cr, 0.5-2% by mass of V, 5-17% by mass of Mo+W, 3-9% by mass of C, and 1-2.5% by mass of B. The carboboride may contain Si, Mn, Ni and Nb in trace amounts.

Because carboboride remarkably exhibits a lubricating function particularly at high temperatures, it is effective to prevent seizure when a hot-rolled strip is folded and bitten by the roll. To exhibit an effective lubricating function, the area ratio of carboboride is 1-20%. When B is less than 0.01% by mass, carboboride within the above area ratio range is not formed. On the other hand, when B exceeds 0.12% by mass, the outer layer becomes brittle. The lower limit of the B content is preferably 0.02% by mass, more preferably 0.03% by mass. The upper limit of the B content is preferably 0.1% by mass.

(2) Optional Elements (a) Nb: 3% or less by Mass

Like V, Nb is also combined with C to form hard MC carbide. Nb is dissolved in MC carbide together with V and Mo, to strengthen the MC carbide, thereby improving the wear resistance of the outer layer. Because the density difference is smaller between NbC and the melt than between VC and the melt, NbC reduces the segregation of MC carbide. When Nb exceeds 3% by mass, MC carbide is aggregated, failing to form a good outer layer. To provide the outer layer with improved wear resistance, the lower limit of the Nb content is preferably 0.1% by mass. The upper limit of the Nb content is preferably 2.8% by mass, more preferably 2.5% by mass, most preferably 2.3% by mass.

(b) W: 4% or less by Mass

W is combined with C to form hard carbides such as $M_6C$ and $M_2C$, contributing to improvement in the wear resistance of the outer layer. It is also dissolved in MC carbide to increase its specific gravity, reducing segregation. However, more than 4% by mass of W increases the specific gravity of the melt, making the segregation of carbides more likely. Accordingly, the preferred content of W, if added, is 4% or less by mass. The upper limit of the W content is more preferably 3.5% by mass, most preferably 3% by mass. To obtain the above effects, the lower limit of the W content is more preferably 0.1% by mass, most preferably 0.2% by mass.

(c) S: 0.05-0.3% by Mass

S forms MnS having a lubricating function, but it embrittles the outer layer when it exceeds 0.3% by mass. To obtain a sufficient lubricating function of MnS, the upper limit of the S content is preferably 0.2% by mass, more preferably 0.15% by mass.

(d) N: 0.01-0.07% by Mass

N makes carbides finer, but it embrittles the outer layer when it exceeds 0.07% by mass. To obtain a sufficient effect of making carbides finer, the lower limit of the N content is preferably 0.01% by mass, more preferably 0.015% by mass. The upper limit of the N content is more preferably 0.06% by mass.

(e) Co: 5% or Less by Mass

Co is an effective element for strengthening the matrix structure, but it reduces the toughness of the outer layer when it exceeds 5% by mass. To obtain a sufficient effect of strengthening the matrix structure, the lower limit of the Co content is preferably 0.1% by mass. The upper limit of the Co content is more preferably 3% by mass.

(f) Zr: 0.5% or Less by Mass

Zr is combined with C to form MC carbide, improving wear resistance. Zr also forms oxide in the melt, and this oxide functions as crystal nuclei for making the solidified structure finer. Further, Zr increases the specific gravity of MC carbide, preventing segregation. However, when Zr exceeds 0.5% by mass, inclusions are undesirably formed. The upper limit of the Zr content is more preferably 0.3% by mass. To obtain sufficient effects, the lower limit of the Zr content is more preferably 0.01% by mass.

(g) Ti: 0.5% or Less by Mass

Ti is combined with N and O to form oxynitride, which is dispersed as nuclei in the melt, making MC carbide finer and more uniform. However, when Ti exceeds 0.5% by mass, the viscosity of the melt increases, resulting in more casting defects. To obtain sufficient effects, the lower limit of the Ti content is preferably 0.005% by mass, more preferably 0.01% by mass. The upper limit of the Ti content is more preferably 0.3% by mass, most preferably 0.2% by mass.

(h) Al: 0.5% or Less by Mass

Al is combined with N and O, graphitization-preventing elements, to form oxynitride, which is dispersed as nuclei in the melt, resulting in the uniform precipitation of fine MC carbide. However, when Al exceeds 0.5% by mass, the outer layer becomes brittle, resulting in deteriorated mechanical properties. To obtain sufficient effects, the lower limit of the Al content is preferably 0.001% by mass, more preferably 0.01% by mass. The upper limit of the Al content is more preferably 0.3% by mass, most preferably 0.2% by mass.

(3) Inevitable Impurities

The balance of the composition of the outer layer is substantially composed of Fe and inevitable impurities. Among the inevitable impurities, the amount of P is preferably as small as possible because P deteriorates mechanical properties. Specifically, the P content is preferably 0.1% or less by mass. As other inevitable impurities, the total amount of elements such as Cu, Sb, Te, Ce, etc. may be 0.7% or less by mass.

(4) Relation Formula

Figure 3:
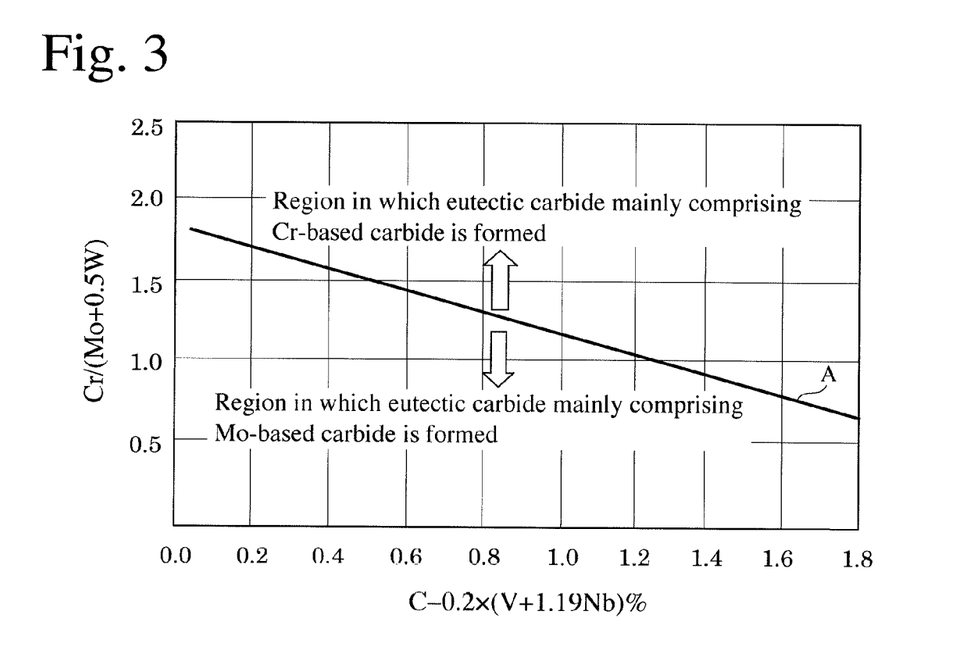
FIG. 3 is a graph showing a region in which eutectic carbide mainly comprising Mo-based carbide is formed.

The outer layer meets the relation expressed by the following formula (1):

$$Cr/(Mo+0.5W) < -2/3[C-0.2(V+1.19Nb)] + 11/6 \quad (1),$$

wherein the symbols of C, Cr, Mo, V, Nb and W represent the amounts (% by mass) of elements expressed by them, and when Nb and W, optional components, are not contained, Nb and W are 0. The formula (1) has been obtained by examining the structure of a steel piece containing these components. Cr/(Mo+0.5W), a left side of the formula (1), represents a ratio of a Cr-carbide-forming element to Mocarbide-forming elements, and [C−0.2(V+1.19Nb)], a right side of the formula (1), represents C balance. The formula (1') of Cr/(Mo+0.5W)=−2/3[C−0.2(V+1.19Nb)]+11/6 is represented by a line A in FIG. 3. Eutectic carbide mainly comprising Mo-based carbide is formed in a region below the line A (not including the line), and eutectic carbide mainly comprising Cr-based carbide is formed in a region on or above the line A (including the line). Accordingly, the formula (1) represents the region below the line A in FIG. 3, in which eutectic carbide mainly comprising Mo-based carbide is formed. Higher wear resistance is generally obtained in the region below the line A, in which eutectic carbide mainly comprising Mo-based carbide is formed, than in the region on or above the line A, in which eutectic carbide mainly comprising Cr-based carbide is formed.

(5) Structure

The structure of the outer layer comprises MC carbide, carbide mainly comprising Mo in the form of $M_2C$ and $M_6C$ (Mo-based carbide), and carboboride. It is presumed by analysis that the carboboride has a composition of $M_{23}(C,B)_6$. The structure of the outer layer 1 additionally comprises slight amounts of Cr-based carbides in the form of $M_7C_3$ and $M_{23}C_6$.

The outer layer comprises 1-15% by area of MC carbide. When MC carbide contributing to wear resistance is less than 1% by area, the outer layer 1 does not have sufficient wear resistance. On the other hand, when the area ratio of MC carbide exceeds 15%, the outer layer 1 becomes brittle. The area ratio of MC carbide is preferably 4% in lower limit, and 12% in upper limit.

The outer layer contains 0.5-20% by area of carboboride, which has a lubricating function to exhibit excellent seizure resistance. The lower limit of the area ratio of carboboride is preferably 1%, more preferably 2%. The upper limit of the area ratio of carboboride is preferably 15%, more preferably 10%.

The outer layer further comprises 0.5-20% by area of Mo-based carbide, which contributes to improving wear resistance. The area ratio of Mo-based carbide is preferably 1% in lower limit, and 12% in upper limit. The matrix is based on martensite and/or bainite, though troostite may be precipitated.

The outer layer preferably meets the relation expressed by the following formula (2):

30.23+2.74×(area ratio of MC carbide)+4.01×(area ratio of Mo-based carbide)−5.63×(area ratio of carboboride)≤50  (2).

The formula (2) is experimentally determined from the influence of each structure element on seizure resistance. With the area ratios of MC carbide, Mo-based carbide and carboboride meeting the relation expressed by the formula (2), the outer layer 1 has excellent seizure resistance. The outer layer 1 has Vickers hardness Hv of preferably 500 or more, more preferably 550-800.

(B) Inner Layer

The inner layer 2 is made of high-strength ductile cast iron, which is called "spheroidal graphite cast iron." To increase the life of the journal portions (shaft portions) 22, 23 of the inner layer 2 as the life of the outer layer 1 gets longer, they preferably have higher wear resistance. If the wearing of the journal portions increased clearance between the journal portions and bearings, the composite roll 10 would have to be discarded. To provide journal portions having high wear resistance, ductile cast iron for the inner layer 2 preferably has a ferrite area ratio of 35% or less. In the ductile cast iron, portions surrounding the precipitated spheroidal graphite tend to have a reduced amount of carbon, having a low-hardness ferrite structure. A higher area ratio of ferrite provides the matrix with lower hardness, and thus lower wear resistance. The ductile cast iron for the inner layer 2 preferably has a ferrite area ratio of 32% or less.

The ferrite area ratio of the ductile cast iron is influenced by the amounts of alloying elements. The composition of the ductile cast iron having a ferrite area ratio of 35% or less comprises by mass 2.3-3.6% of C, 1.5-3.5% of Si, 0.2-2.0% of Mn, 0.3-2.5% of Ni, 0.05-1.0% of Cr, 0.05-1.0% of Mo, 0.01-0.08% of Mg, and 0.05-1.0% of V, the balance being Fe and inevitable impurities. In addition to the above indispensable elements, 0.7% or less of Nb, and 0.7% or less of W may be contained. Further, to reduce the ferrite area ratio, up to 0.5% of P may be added, though about 0.005-0.05% of P is usually contained as an impurity element in the ductile cast iron. The iron matrix of the ductile cast iron is based on ferrite and pearlite, and additionally contains graphite and a trace amount of cementite.

[2] Production method of centrifugally cast, hot-rolling composite roll

Figure 2A:
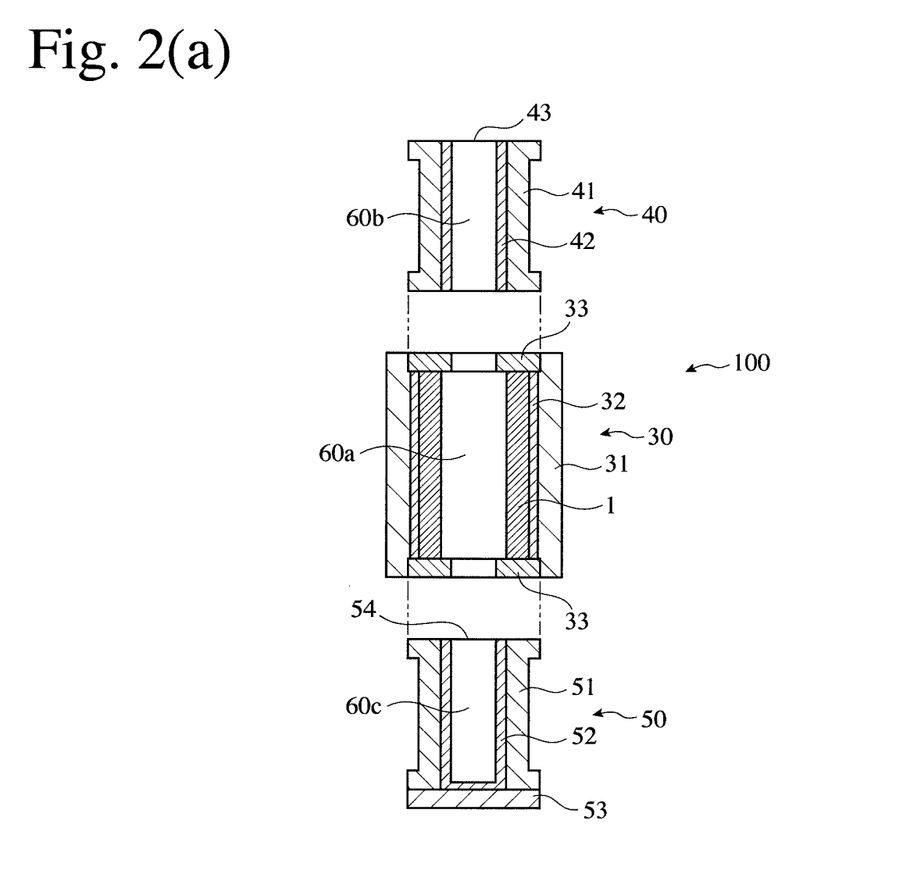
FIG. 2(a) is an exploded cross-sectional view showing an example of casting molds used for producing the centrifugally cast composite roll of the present invention.
Figure 2B:
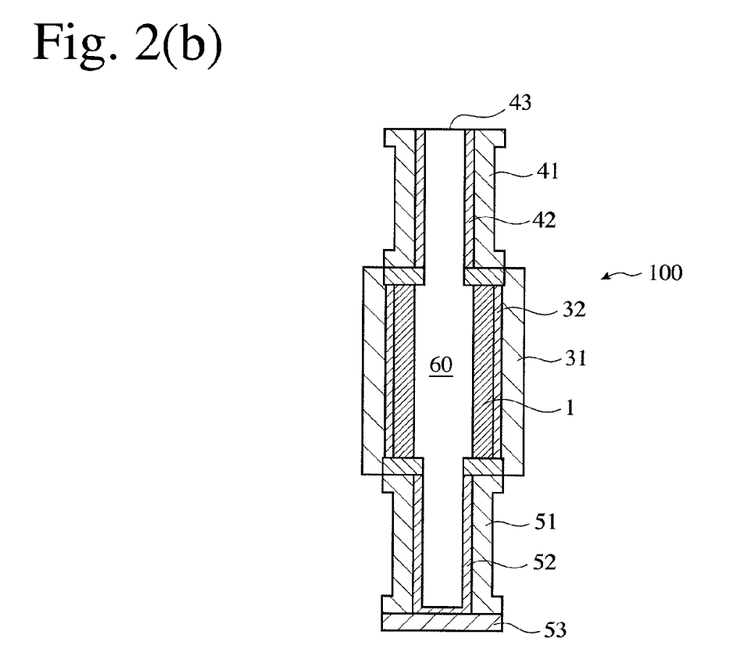
FIG. 2(b) is a cross-sectional view showing an example of casting molds used for producing the centrifugally cast composite roll of the present invention.

FIGS. 2(*a*) and 2(*b*) show an example of stationary casting molds for casting an inner layer 2 after centrifugally casting an outer layer 1 by a cylindrical centrifugal casting mold 30. A stationary casting mold 100 comprises a cylindrical casting mold 30 having an inner surface on which the outer layer 1 is formed, and an upper mold 40 and a lower mold 50 attached to upper and lower ends of the cylindrical casting mold 30. An inner surface of the outer layer 1 in the cylindrical casting mold 30 constitutes a cavity 60*a* for forming a core portion 21 of the inner layer 2, the upper mold 40 has a cavity 60*b* for forming a shaft portion 23 of the inner layer 2, and the lower mold 50 has a cavity 60*c* for forming a shaft portion 22 of the inner layer 2. A centrifugal casting method using the cylindrical casting mold 30 may be a horizontal, inclined or vertical type.

With the upper mold 40 and the lower mold 50 assembled to upper and lower ends of the cylindrical casting mold 30, the cavity 60*a* in the outer layer 1 communicates with the cavity 60*b* of the upper mold 40 and the cavity 60*c* of the lower mold 50, thereby forming a cavity 60 for integrally forming the entire inner layer 2. 32 and 33 in the cylindrical casting mold 30 represent sand molds. Also, 42 in the upper mold 40 and 52 in the lower mold 50 represent sand molds. The lower mold 50 is provided with a bottom plate 53 for holding a melt for the inner layer. The cylindrical mold 30 with the centrifugally cast outer layer 1 is vertically placed on the lower mold 50 for forming the shaft portion 22, and the upper mold 40 for forming the shaft portion 23 is placed on the cylindrical mold 30, thereby constituting the stationary casting mold 100 for forming the inner layer 2.

In the stationary casting mold 100, as a ductile cast iron melt for the inner layer 2 is poured into the cavity 60 through an upper opening 43 of the upper mold 40 during or after solidifying the outer layer formed by a centrifugal casting method, a surface of the melt in the cavity 60 is gradually elevated from the lower mold 50 to the upper mold 40, integrally forming the inner layer 2 constituted by the shaft portion 22, the core portion 21 and the shaft portion 23.

When a melt for the inner layer is poured after forming the outer layer by a centrifugal casting method, the temperature of the outer layer 1 is elevated by the inner layer melt. The temperature of a usable region of the outer layer 1 at that time is called the reheating temperature of the outer layer 1. When the reheating temperature is higher than 1100° C., carboboride having a relatively low melting point (about 1100° C.), which is formed in the outer layer 1 containing B, is melted to generate microcavity defects. Oppositely, when the reheating temperature of the outer layer 1 is too low (the casting temperature of the inner layer 2 is too low), the inner layer 2 is not sufficiently fused to the outer layer 1. Accordingly, the reheating temperature of a usable region of the outer layer 1 is preferably 500° C. to 1100° C. This condition need only be met at least in an effective rolling diameter range of the outer layer 1.

The present invention will be explained in more detail by Examples below without intention of restricting the scope of this invention.

Examples 1-7, and Comparative Examples 1 and 2

With a cylindrical casting mold 30 (inner diameter: 800 mm, and length: 2500 mm) having the structure shown in FIG. 2(a) set in a horizontal centrifugal casting machine, each melt having a composition shown in Table 1 was centrifugally cast to form an outer layer 1. After the solidification of the outer layer 1, the cylindrical casting mold 30 having the outer layer 1 (thickness: 90 mm) formed on its inner surface was erected and placed on a hollow lower mold 50 (inner diameter: 600 mm, and length: 1500 mm) for forming a shaft portion 22, and a hollow upper mold 40 (inner diameter: 600 mm, and length: 2000 mm) for forming a shaft portion 23 was vertically placed on the cylindrical casting mold 30, thereby constituting a stationary casting mold 100 shown in FIG. 2(b).

A ductile cast iron melt having a chemical composition comprising by mass 3.0% of C, 2.6% of Si, 0.3% of Mn, 1.4% of Ni, 0.1% of Cr, 0.2% of Mo, 0.05% of Mg, 0.03% of P, and 0.03% of S, the balance being substantially Fe and inevitable impurities, was poured into a cavity 60 of the stationary casting mold 100 through its upper opening 43, and a graphitization inoculating agent containing Si was added thereto during pouring, to produce a composite roll comprising an inner layer 2 integrally fused to an inner surface of the outer layer 1.

TABLE 1

| No. | Outer Layer Composition[1] (% by mass) | | | | | | | |
|---|---|---|---|---|---|---|---|---|
| | C | Si | Mn | Cr | Mo | V | Nb | W |
| Example 1 | 2.03 | 0.92 | 0.85 | 5.23 | 7.00 | 6.11 | 0.36 | 0.12 |
| Example 2 | 1.85 | 0.81 | 0.32 | 4.67 | 5.62 | 6.13 | — | — |
| Example 3 | 2.01 | 0.84 | 0.48 | 5.58 | 6.07 | 6.25 | 0.62 | 0.89 |
| Example 4 | 1.63 | 0.79 | 0.61 | 4.53 | 4.34 | 4.27 | 0.52 | 0.44 |
| Example 5 | 2.39 | 1.82 | 0.91 | 4.24 | 5.20 | 5.60 | 0.62 | 0.34 |
| Example 6 | 1.81 | 0.77 | 0.47 | 4.77 | 5.34 | 5.58 | — | 0.57 |
| Example 7 | 1.92 | 0.51 | 1.29 | 5.03 | 5.87 | 5.91 | 0.41 | — |
| Com. Ex. 1 | 1.85 | 0.92 | 0.85 | 5.12 | 6.11 | 5.24 | 1.47 | 0.18 |
| Com. Ex. 2 | 1.67 | 1.28 | 1.02 | 3.97 | 4.32 | 4.01 | 0.44 | 0.54 |

| No. | Outer Layer Composition[1] (% by mass) | | | | | | | |
|---|---|---|---|---|---|---|---|---|
| | B | S | N | Ni | Co | Zr | Ti | Al |
| Example 1 | 0.096 | — | 0.048 | 2.48 | — | — | — | — |
| Example 2 | 0.092 | — | 0.040 | 1.21 | — | — | 0.05 | — |
| Example 3 | 0.079 | — | 0.059 | 1.86 | — | — | — | — |
| Example 4 | 0.052 | 0.18 | 0.029 | 1.92 | — | — | — | 0.020 |
| Example 5 | 0.074 | 0.21 | 0.042 | 3.13 | — | — | — | — |
| Example 6 | 0.087 | — | 0.037 | 1.86 | 0.12 | 0.15 | 0.029 | 0.021 |
| Example 7 | 0.060 | 0.14 | 0.042 | 1.92 | — | — | — | — |
| Com. Ex. 1 | 0.007 | — | 0.039 | — | — | — | — | — |
| Com. Ex. 2 | — | — | 0.041 | 0.41 | — | — | — | — |

Note:
[1]The symbol of "—" means "not added."

| No. | Left Side[1] of Formula (1) | Right side[2] of Formula (1) |
|---|---|---|
| Example 1 | 0.74 | 1.35 |
| Example 2 | 0.83 | 1.42 |
| Example 3 | 0.86 | 1.43 |
| Example 4 | 0.99 | 1.40 |
| Example 5 | 0.79 | 1.09 |

TABLE 1-continued

| Example 6 | 0.85 | 1.37 |
|---|---|---|
| Example 7 | 0.86 | 1.41 |
| Com. Ex. 1 | 0.83 | 1.53 |
| Com. Ex. 2 | 0.86 | 1.32 |

Note:
[1]The value of $Cr/(Mo + 0.5W)$.
[2]The value of $-2/3[C - 0.2(V + 1.19Nb)] + 11/6$.

A sample cut out of the outer layer in each of Examples and Comparative Examples was measured with respect to Vickers hardness Hv. The results are shown in Table 3.

The structure of a test piece cut out of the outer layer in each of Examples and Comparative Examples was observed by an optical microscope by the following steps.

Step 1: Each test piece was mirror-polished while avoiding carbides from projecting.

Step 2: Each test piece was etched with a Murakami's reagent for about 30 seconds, to take an optical photomicrograph A of its structure.

Step 3: Each test piece was buffed with a paste of fine diamond particles having an average particle size of 3 μm for 10-30 seconds.

Step 4: An optical photomicrograph B of the structure of each test piece was taken in the same field as in the photograph of Step 2.

Step 5: Each test piece was electrolytically etched with chromic acid for about 1 minute, to take an optical photomicrograph C of its structure in the same field as in the photograph of Step 2.

Step 6: Each test piece was etched with an aqueous ammonium persulfate solution for about 1 minute.

Step 7: An optical photomicrograph D of the structure of each test piece was taken in the same field as in the photograph of Step 2.

Figure 6:
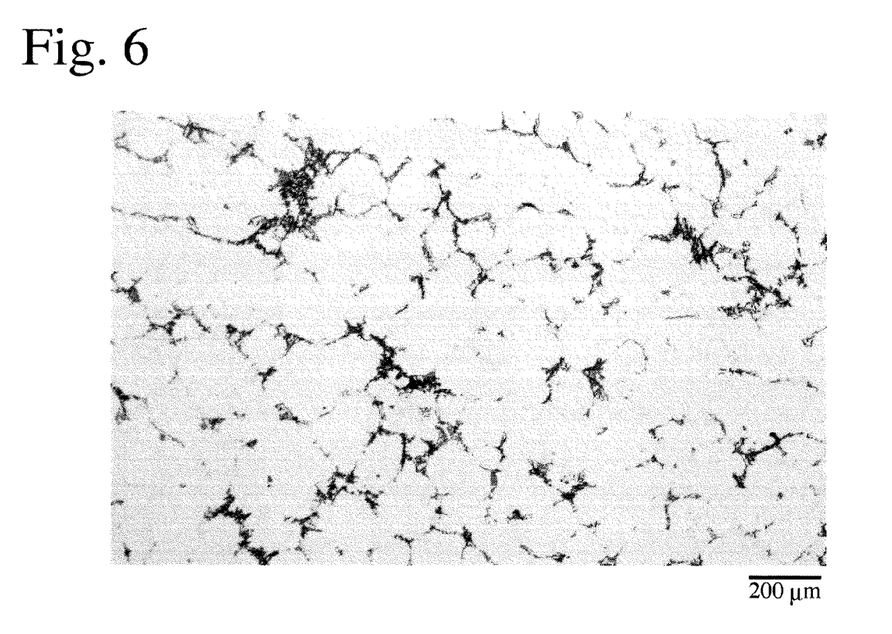
FIG. 6 is an optical photomicrograph A of a test piece of Example 2.
Figure 7:
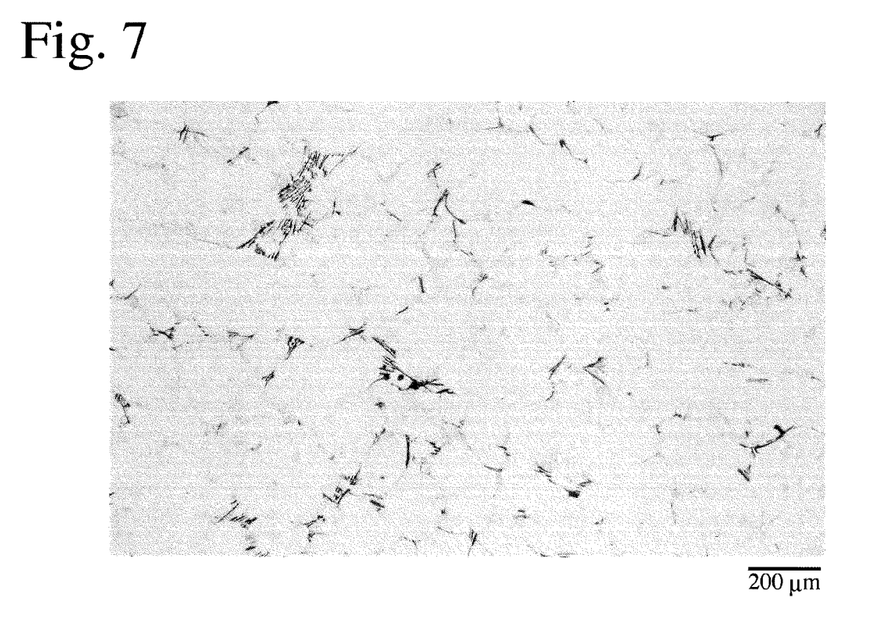
FIG. 7 is an optical photomicrograph B of a test piece of Example 2.
Figure 8:
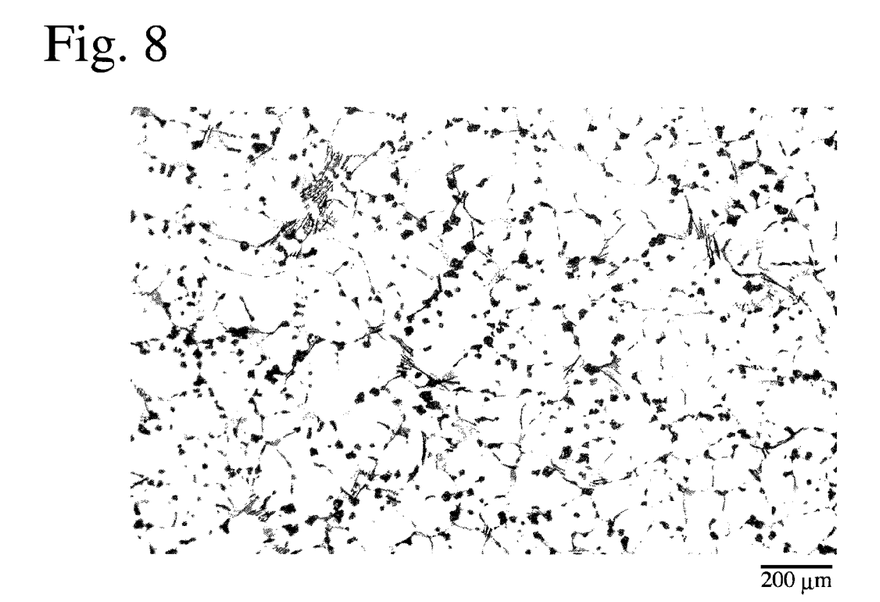
FIG. 8 is an optical photomicrograph C of a test piece of Example 2.
Figure 9:
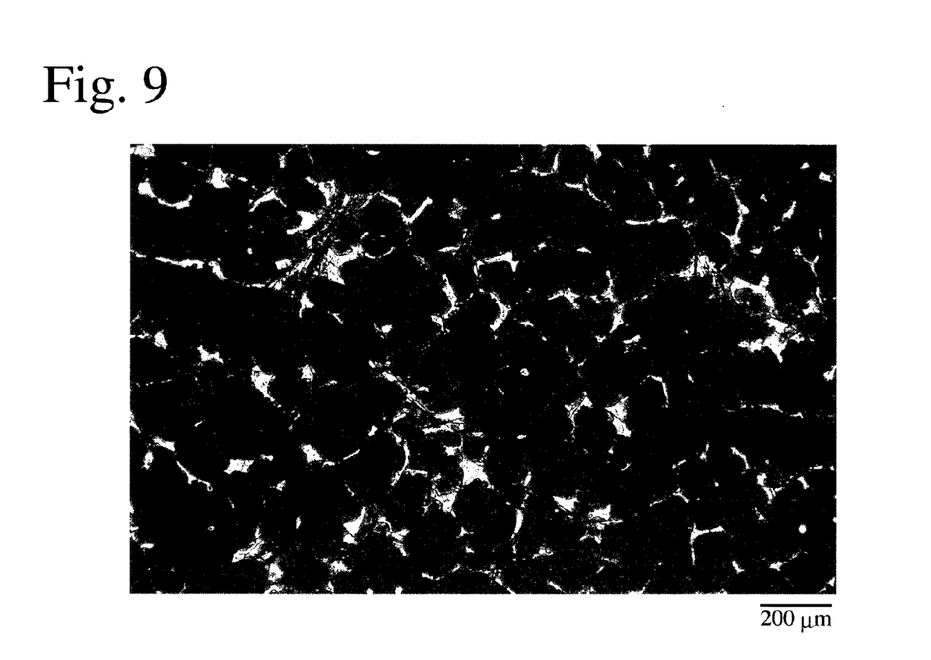
FIG. 9 is an optical photomicrograph D of a test piece of Example 2.

With respect to the test piece of Example 2, the optical photomicrograph A is shown in FIG. 6, the optical photomicrograph B is shown in FIG. 7, the optical photomicrograph C is shown in FIG. 8, and the optical photomicrograph D is shown in FIG. 9. Structure elements measurable from the photographs A-D are shown by "Yes" in Table 2.

TABLE 2

| Photograph | MC Carbide | Mo-Based Carbide | Cr-Based Carbide | Carboboride | Matrix |
|---|---|---|---|---|---|
| A | — | Yes | Yes | — | — |
| B | — | Yes | — | — | — |
| C | Yes | Yes | — | — | — |
| D | Yes | Yes | — | — | Yes |

Using an image analysis software, the area ratios of MC carbide, Mo-based carbide and carboboride were determined from the photographs by the following method. The results are shown in Table 3.

(1) Because black portions are composed of Mo-based carbide and Cr-based carbide in the optical photomicrograph A, the area ratio of Mo-based carbide+Cr-based carbide was determined from the photograph A.

(2) Because black portions are composed of Mo-based carbide in the optical photomicrograph B, the area ratio of Mo-based carbide was determined from the photograph B. The area ratio of Cr-based carbide was determined by subtracting the area ratio of Mo-based carbide determined from the photograph B from the area ratio of Mo-based carbide+Cr-based carbide determined from the photograph A.

(3) Because black portions are composed of MC carbide and Mo-based carbide in the optical photomicrograph C, the area ratio of MC carbide+Mo-based carbide was determined from the photograph C. The area ratio of MC carbide was determined by subtracting the area ratio of Mo-based carbide determined from the photograph B from the area ratio of MC carbide+Mo-based carbide determined from the photograph C.

(4) Because black portions are composed of a matrix, MC carbide and Mo-based carbide, and white portions are composed of carboboride and Cr-based carbide in the optical photomicrograph D, the area ratio of carboboride was determined by subtracting the area ratio of Cr-based carbide determined in (2) above from the area ratio of carboboride+Cr-based carbide determined from the photograph D.

TABLE 3

| No. | Area Ratio (%) | | | Left Side of Formula (2) | Vickers Hardness Hv |
|---|---|---|---|---|---|
| | MC Carbide | Mo-Based carbide | Carboboride | | |
| Example 1 | 9.08 | 6.37 | 7.50 | 38.43 | 688.5 |
| Example 2 | 8.68 | 0.80 | 5.26 | 27.61 | 637.8 |
| Example 3 | 9.97 | 9.62 | 11.23 | 32.90 | 727.0 |
| Example 4 | 6.58 | 0.97 | 2.08 | 40.44 | 633.8 |
| Example 5 | 10.95 | 9.50 | 11.56 | 33.25 | 673.1 |
| Example 6 | 7.76 | 5.59 | 5.77 | 41.42 | 664.2 |
| Example 7 | 8.88 | 1.52 | 5.59 | 29.18 | 654.6 |
| Com. Ex. 1 | 9.42 | 5.78 | 0.41 | 76.91 | 684.8 |
| Com. Ex. 2 | 6.98 | 7.52 | 0.00 | 79.51 | 625.6 |

Note:
The left side of the formula (2) = 30.23 + 2.74 × (area ratio of MC carbide) + 4.01 × (area ratio of Mo-based carbide) − 5.63 × (area ratio of carboboride).

The structure observation revealed that there were no micro-cavities in effective rolling diameter ranges of the outer layers of Examples 1-7. Because low-melting-point carboboride is melted by the reheating of the outer layer to higher than 1100° C. by casting the inner layer, resulting in micro-cavities, it may be presumed from the above observation that the reheating temperature of the outer layer in the effective rolling diameter range was 1100° C. or lower.

Analysis by a field emission electron probe microanalyzer (FE-EPMA) revealed that carboboride in the outer layer structure of Example 2 had a composition mainly comprising by mass 66.2% of Fe, 12.8% of Cr, 1.2% of V, 13.3% of Mo+W, 3.6% of C, and 1.7% of B.

Figure 4:
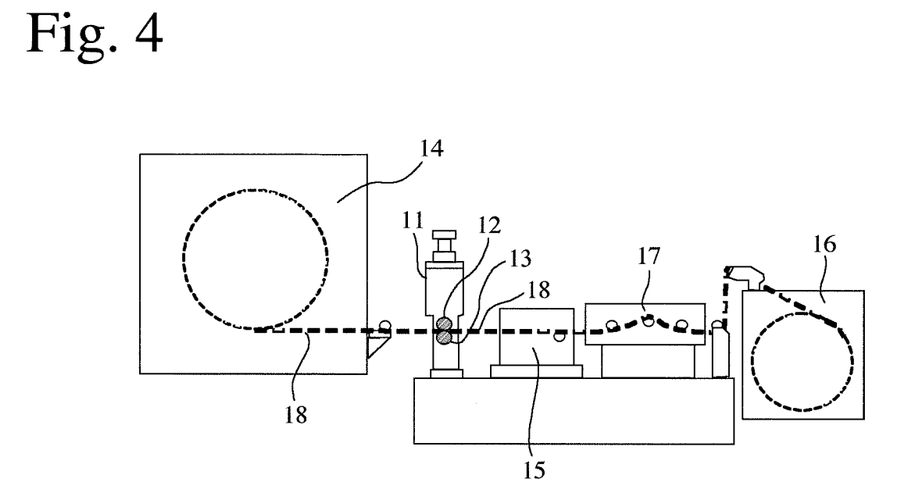
FIG. 4 is a schematic view showing a wearing-by-rolling test machine.

A test roll of a sleeve structure having an outer diameter of 60 mm, an inner diameter of 40 mm and a width of 40 mm was produced by a melt for each outer layer of Examples 1-7 and Comparative Examples 1 and 2. To evaluate wear resistance, a wear test was conducted on each test roll by a wearing-by-rolling test machine shown in FIG. 4. The wearing-by-rolling test machine comprises a rolling mill 11, test rolls 12, 13 assembled in the rolling mill 11, a heating furnace 14 for preheating a strip 18 to be rolled, a cooling water bath 15 for cooling a rolled strip 18, a winding machine 16 for giving tension to the strip during rolling, and a controller 17 for adjusting the tension. The wearing conditions by rolling were as follows. After rolling, the depth of wear on the test roll surface was measured by a stylus-type surface roughness meter. The results are shown in Table 4.
Sheet to be rolled: SUS304
Compression ratio: 25%
Rolling speed: 150 m/minute
Temperature of strip to be rolled: 900° C.
Rolling distance: 300 m each
Cooling of roll: Cooling with water
Number of rolls: 4

Figure 5:
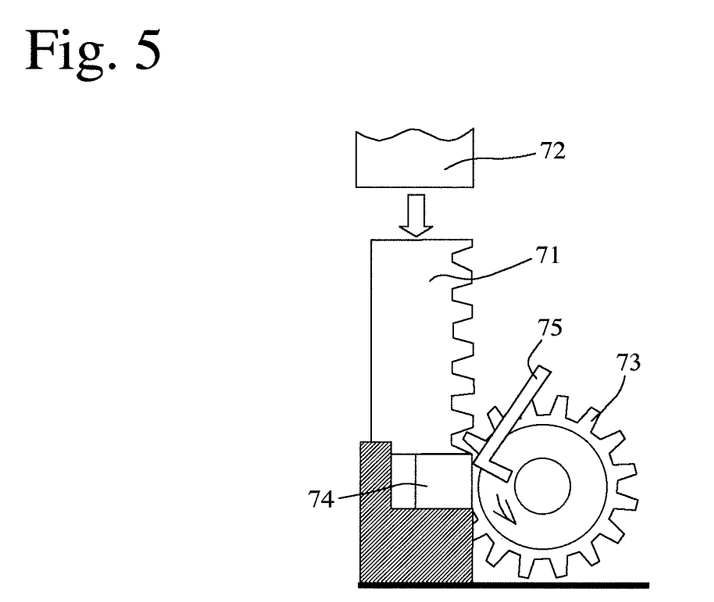
FIG. 5 is a schematic view showing a friction heat shock test machine.

To evaluate failure resistance, a seizure test was conducted on each test roll by a friction heat shock test machine shown in FIG. 5. In the friction heat shock test machine, a weight 72 is dropped onto a rack 71 to rotate a pinion 73, so that a member to be bitten 75 is brought into strong contact with a test piece 74. Seizure was evaluated by its area ratio as follows. The results are shown in Table 4. The smaller the seizure, the better the failure resistance.

Good: Substantially no seizure (the area ratio of seizure was less than 40%).
Fair: Slight seizure (the area ratio of seizure was 40% or more and less than 60%).
Poor: Extreme seizure (the area ratio of seizure was 60% or more).

TABLE 4

| | Outer Layer | |
|---|---|---|
| No. | Wear (μm) | Seizure |
| Example 1 | 8.0 | Good |
| Example 2 | 9.2 | Good |
| Example 3 | 5.9 | Good |
| Example 4 | 13.6 | Fair |
| Example 5 | 4.2 | Good |
| Example 6 | 10.9 | Fair |
| Example 7 | 8.6 | Good |
| Com. Ex. 1 | 7.3 | Poor |
| Com. Ex. 2 | 12.8 | Poor |

EFFECT OF THE INVENTION

Because the outer layer of the centrifugally cast, hot-rolling composite roll of the present invention contains 0.01-0.12% of B, carboboride is formed to improve its seizure resistance. Also, the outer layer of the centrifugally cast, hot-rolling composite roll of the present invention has high wear resistance by MC carbide. In addition, the roll of the present invention suffers little surface damage under a rolling load because of excellent wear resistance, and is highly resistant to seizure and surface roughening by a strip to be rolled because of excellent seizure resistance. As a result, the roll keeps a smooth surface after rolling, producing high-quality rolled products. The centrifugally cast, hot-rolling composite roll of the present invention having not only high wear resistance but also excellent seizure resistance and surface roughening resistance is suitable for a finish rolling stage in a hot strip mill.

DESCRIPTION OF REFERENCE NUMERALS

10: Centrifugally cast, hot-rolling composite roll
1: Outer layer
2: Inner layer
21: Core portion
22, 23: Shaft portion
11: Rolling mill
12, 13: Test roll
14: Heating furnace
15: Cooling water bath
16: Winding machine
17: Controller
18: Sheet to be rolled 100: Stationary casting mold
30: Cylindrical centrifugal casting mold
32, 33, 42, 52: Sand mold
40: Upper mold for stationary casting
50: Lower mold for stationary casting
60, 60a, 60b, 60c: Cavity
71: Rack
72: Weight
73: Pinion
74: Test piece
75: Member to be bitten

What is claimed is:

1. A centrifugally cast, hot-rolling composite roll comprising an outer layer formed by a centrifugal casting method, and an inner layer made of ductile cast iron and integrally fused to said outer layer;
said outer layer having a chemical composition comprising by mass 1-3% of C, 0.4-3% of Si, 0.3-3% of Mn, 1-5% of Ni, 2-7% of Cr, 3-8% of Mo, 3-7% of V, and 0.01-0.12% of B, the balance being Fe and inevitable impurities, and meeting the relation expressed by the following formula (1):

$$Cr/(Mo+0.5W) < -2/3[C-0.2(V+1.19Nb)]+11/6 \quad (1),$$

wherein W=0, and Nb=0, when W and Nb, optional components, are not contained; and
said outer layer containing by area 1-15% of MC carbide, 0.5-20% of carboboride, and 0.5-20% of Mo-based carbide.

2. The centrifugally cast, hot-rolling composite roll according to claim 1, wherein said outer layer further comprises 3% or less by mass of Nb and/or 4% or less by mass of W.

3. The centrifugally cast, hot-rolling composite roll according to claim 1, wherein said outer layer further comprises 0.05-0.3% by mass of S.

4. The centrifugally cast, hot-rolling composite roll according to claim 1, wherein said outer layer further comprises 0.01-0.07% by mass of N.

5. The centrifugally cast, hot-rolling composite roll according to claim 1, wherein said outer layer further comprises by mass at least one selected from the group consisting of 5% or less of Co, 0.5% or less of Zr, 0.5% or less of Ti, and 0.5% or less of Al.

6. The centrifugally cast, hot-rolling composite roll according to claim 1, wherein said outer layer meets the relation expressed by the following formula (2):

$$30.23+2.74\times(\text{area ratio of MC carbide})+4.01\times(\text{area ratio of Mo-based carbide})-5.63\times(\text{area ratio of carboboride}) \leq 50 \quad (2).$$

7. The centrifugally cast, hot-rolling composite roll according to claim 1, wherein said outer layer has Vickers hardness Hv of 500 or more.

8. The centrifugally cast, hot-rolling composite roll according to claim 1, wherein said outer layer further comprises by mass 3% or less of Nb and/or 4% or less by mass of W, and 0.05-0.3% of S.

9. The centrifugally cast, hot-rolling composite roll according to claim 1, wherein said outer layer further comprises by mass 3% or less of Nb and/or 4% or less by mass of W, and 0.01-0.07% of N.

10. The centrifugally cast, hot-rolling composite roll according to claim 1, wherein said outer layer further comprises by mass 0.05-0.3% of S, and 0.01-0.07% of N.

11. The centrifugally cast, hot-rolling composite roll according to claim 1, wherein said outer layer further comprises by mass 3% or less of Nb and/or 4% or less by mass of W, 0.05-0.3% of S, and 0.01-0.07% of N.

12. The centrifugally cast, hot-rolling composite roll according to claim 1, wherein said outer layer further comprises by mass 3% or less of Nb and/or 4% or less by mass of W, and at least one selected from the group consisting of 5% or less of Co, 0.5% or less of Zr, 0.5% or less of Ti and 0.5% or less of Al.

13. The centrifugally cast, hot-rolling composite roll according to claim 1, wherein said outer layer further comprises by mass 0.05-0.3% of S, and at least one selected from the group consisting of 5% or less of Co, 0.5% or less of Zr, 0.5% or less of Ti and 0.5% or less of Al.

14. The centrifugally cast, hot-rolling composite roll according to claim 1, wherein said outer layer further comprises by mass 0.01-0.07% of N, and at least one selected from the group consisting of 5% or less of Co, 0.5% or less of Zr, 0.5% or less of Ti and 0.5% or less of Al.

15. The centrifugally cast, hot-rolling composite roll according to claim 1, wherein said outer layer further comprises by mass 0.05-0.3% of S, 0.01-0.07% of N, and at least one selected from the group consisting of 5% or less of Co, 0.5% or less of Zr, 0.5% or less of Ti and 0.5% or less of Al.

16. The centrifugally cast, hot-rolling composite roll according to claim 1, wherein said outer layer further comprises by mass 3% or less of Nb and/or 4% or less by mass of W, 0.05-0.3% of S, and at least one selected from the group consisting of 5% or less of Co, 0.5% or less of Zr, 0.5% or less of Ti and 0.5% or less of Al.

17. The centrifugally cast, hot-rolling composite roll according to claim 1, wherein said outer layer further comprises by mass 3% or less of Nb and/or 4% or less by mass of W, 0.01-0.07% of N, and at least one selected from the group consisting of 5% or less of Co, 0.5% or less of Zr, 0.5% or less of Ti and 0.5% or less of Al.

18. The centrifugally cast, hot-rolling composite roll according to claim 1, wherein said outer layer further comprises by mass 3% or less of Nb and/or 4% or less by mass of W, 0.05-0.3% of S, 0.01-0.07% of N, and at least one selected from the group consisting of 5% or less of Co, 0.5% or less of Zr, 0.5% or less of Ti and 0.5% or less of Al.

19. The centrifugally cast, hot-rolling composite roll according to claim 1, wherein the chemical composition of the outer layer has a C content of by mass 1-2.9%.

* * * * *